United States Patent [19]
Maso

[11] Patent Number: 5,511,342
[45] Date of Patent: Apr. 30, 1996

[54] FLOWER-POTS FORMING A MODULAR STRUCTURE

[75] Inventor: Giovanna Maso, Nove, Italy

[73] Assignee: Abruzzovasi Srl, Cellino Attanasio (TE), Italy

[21] Appl. No.: 346,201

[22] Filed: Nov. 22, 1994

[51] Int. Cl.⁶ ................................................ A01G 9/02
[52] U.S. Cl. .................................................. 47/83; 47/86
[58] Field of Search ............................ 47/82, 83, 85, 47/86, 71

[56] References Cited

U.S. PATENT DOCUMENTS

| | | |
|---|---|---|
| 2,035,001 | 3/1936 | Taber . |
| 3,828,472 | 8/1974 | Vermeulen .................................. 47/86 |
| 3,920,144 | 11/1975 | Callen ........................................ 47/85 |
| 4,355,485 | 10/1982 | Frank ......................................... 47/82 |

FOREIGN PATENT DOCUMENTS

| | | | |
|---|---|---|---|
| 142471 | 5/1985 | European Pat. Off. | .................... 47/83 |
| 120768 | 3/1900 | Germany . | |
| 340461 | 9/1959 | Switzerland | ................................ 47/85 |
| 2230413 | 10/1990 | United Kingdom | ........................ 47/82 |

*Primary Examiner*—Henry E. Raduazo
*Attorney, Agent, or Firm*—Watson Cole Stevens Davis

[57] ABSTRACT

The invention discloses flower pots forming a self-supporting modular structure comprising a plurality of flower pots (4, 7) each comprising first container elements (41; 71) united together through at least one channel (42; 72) and suited to contain ornamental plants, co-axially matchable through the fixed joint formed by their matching profiles (8, 9). Each of the mentioned flower pots (4, 7) can be co-axially matched with a second container element (5) through the fixed joint formed their matching profiles (8; 9). Moreover, each of said container elements (41, 71) fits co-axially inside an underpot tray (10).

8 Claims, 3 Drawing Sheets

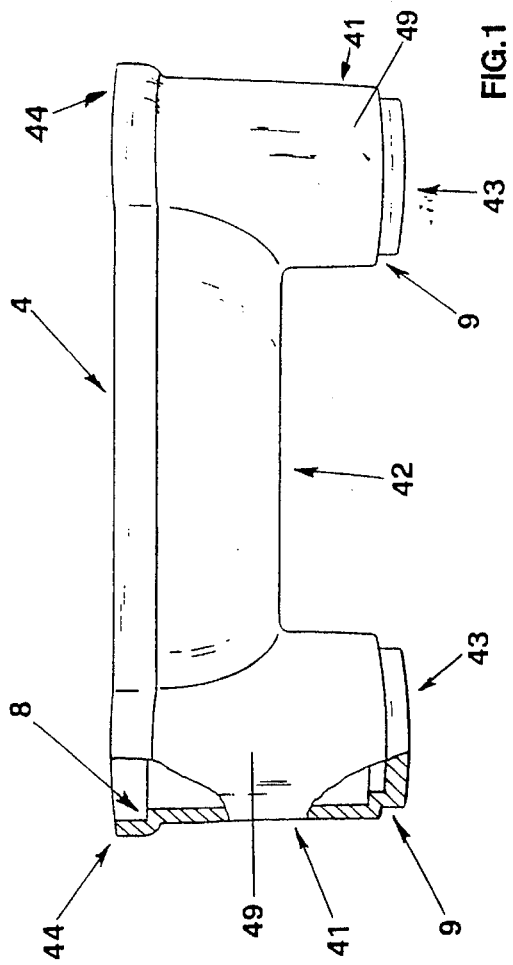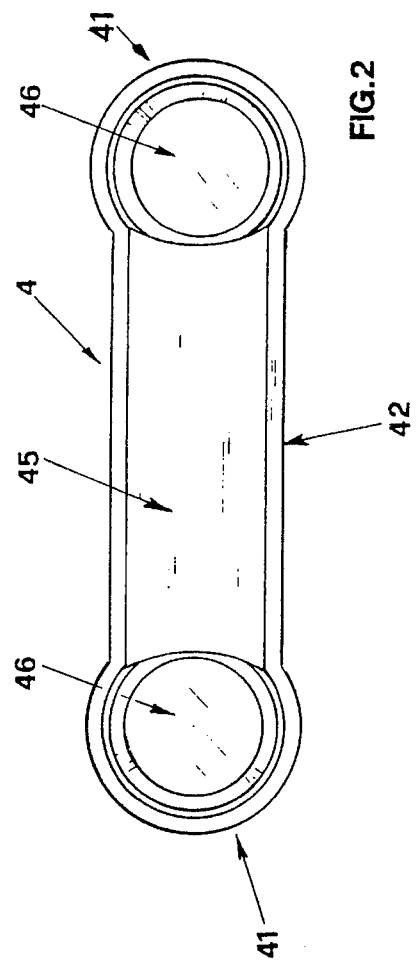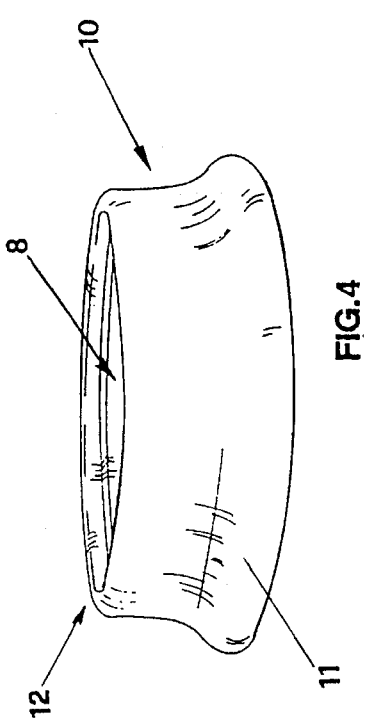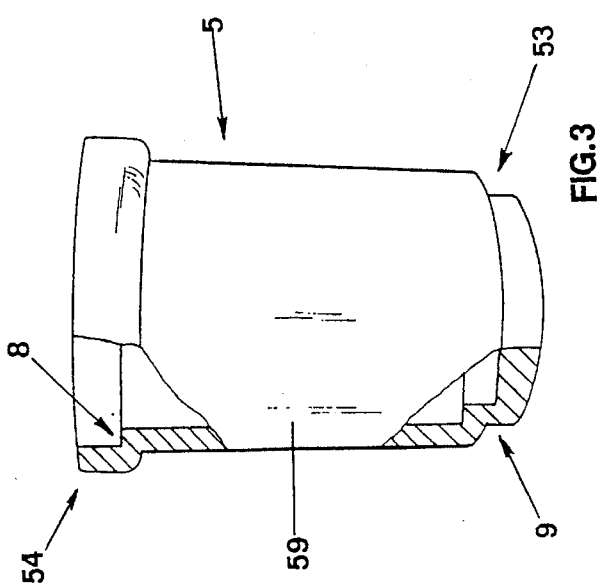

FLOWER-POTS FORMING A MODULAR STRUCTURE

BACKGROUND OF THE INVENTION

1. Field of the Invention

The invention concerns a modular structure particularly suited to contain plants and to cultivate flowers and ornamental plants.

2. General State of the Art

It is a known fact that the cultivation of ornamental and flowering plants is carried out in the classical flower-pots, which present truncated-cone, parallelepipedal, polygonal or other shapes and are mostly made of clay, ceramic or similar materials.

The flower pots of the known types are mostly set on the floor or are arranged on window sills or they are inserted into plant stands or baskets, which are then hung on walls or on the walls of balconies or traces.

Sometimes said flower pots are also arranged on shelves or on supporting structures presenting different shapes and this is done especially when the object is to cover walls with flowers.

It is easy to understand that the use of the flower pots available on the market is rather limiting for achieving the effect of covering walls with flowers, since the supporting structures on which the flower pots are to be arranged require a specific study of shape and dimensions, which must also take into consideration materials harmonizing with the surroundings in which they are to be set.

Another limitation of the pots of the known type for this kind of application consists in that the supporting structures on which they are arranged are often inflexible, in the sense that the modification of their shape requires a certain amount of assembly and taking apart operations, which are often long and hard to perform, even when said structures are of the modular type.

Not the least inconvenience is represented by the fact that said structures are rather costly and require a good amount of maintenance, particularly when they are installed in the open air.

SUMMARY OF THE INVENTION

In order to overcome the above mentioned inconveniences the flower pots forming a self-supporting modular structure according to the present invention are being disclosed with the purpose of allowing the vertical arrangement of flower pots, without any need for supporting elements or structures resting on the ground or hung on the walls.

Said self-supporting modular structure also has the purpose of allowing the arrangement of the ornamental plants on vertical planes regardless of their arrangement within that space.

Another purpose is for the self-supporting structure to be easily changed in shape and arrangement.

The just mentioned purposes are reached through flower pots forming a self-supporting modular structure, which in accordance with the main claim is characterized in that it comprises a plurality of flower :pots, each consisting of first container elements, united with each other through at least one channel suited to be joined together co-axially through fixed joints by means of their profiles matching each other, arranged on the opening and on the bottom of each of said elements, said at least one channel presenting a distance from the bottom of each of said container elements at least equal to the height of at least one of said matching profiles.

Each of said first container elements can also be joined co-axially with a second container element through the fixed joint formed by their matching profiles. fixed with a second container elements Moreover, each of said first and, can fit into an underpot tray which is set on the ground. Through the structure according to the invention it is possible to obtain wallcoverings consisting of flower pots developing in any direction, both in height and in depth, the shape of which can be changed, following the taste of the user, by always using the same elements which form it.

BRIEF DESCRIPTION OF THE DRAWINGS

Further scope of applicability of the present invention will become apparent from the detailed description given hereinafter. However, it should be understood that the detailed and specific examples, while indicating preferred embodiments of the invention, are given by way of illustration only, since various changes and modification within the spirit and scope of the invention will become apparent to those skilled in the art from this detailed description and from the drawings, wherein;

FIG. 1 represents one of the pots forming a structure, comprising a pair of container elements joined together through a joining channel;

FIG. 2 shows a top view of the pot of FIG. 1;

FIG. 3 shows one of the second container elements forming the structure according to the invention;

FIG. 4 represents an underpot-tray suited to receive any one of the container elements represented in the FIGS. 1 and 3;

DESCRIPTION OF THE PREFERRED EMBODIMENT

Figure 5:
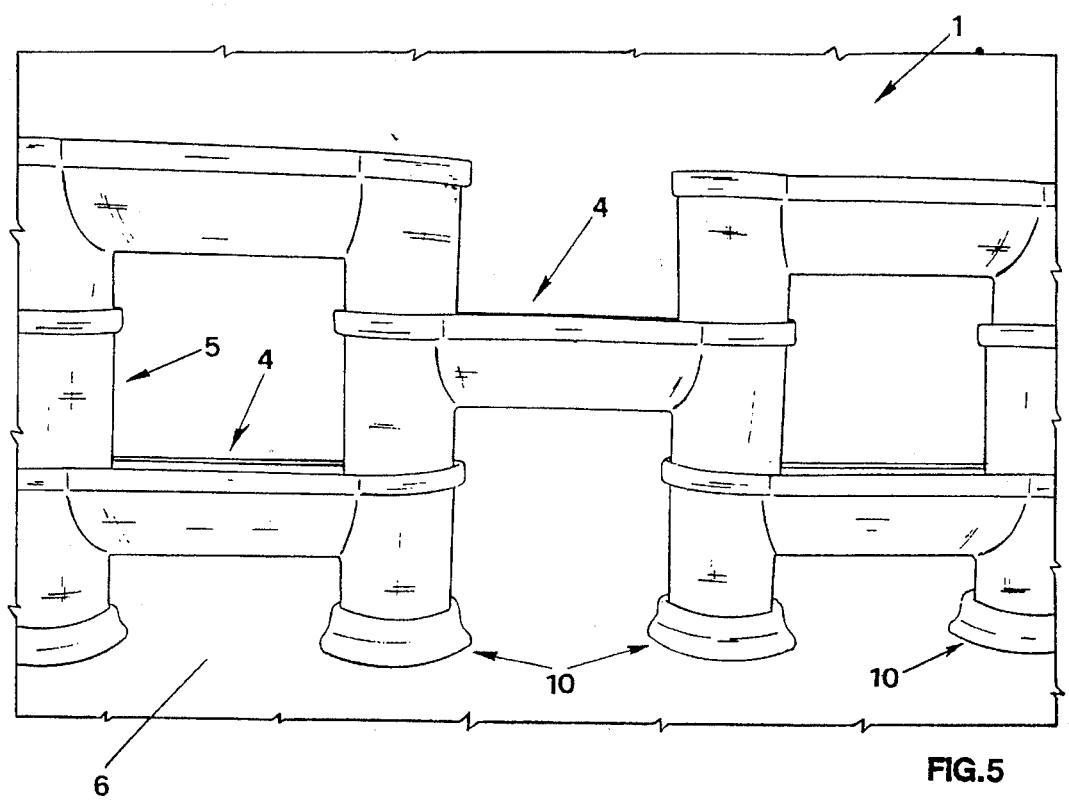
FIG. 5 represents the self-supporting modular structure developing in the vertical direction.

The self-supporting modular structure according to the invention is represented in FIG. 5, wherein it is indicated as a whole with 1. It can be observed that it consists of a plurality of flower pots, each being indicated as a whole with 4 and represented in the FIGS. 1 and 2, and of a plurality of second container elements, each being indicated with 5 and represented in FIG. 3, pots and second elements being stacked on each other.

Each pot 4 consists of a pair of first container elements 41, each comprising a body 49, joined together through a connecting channel 42. Each container element 41 presents a bottom 43 which is indented in relation to the outer surface of the container element, while its upper opening 44 is wider than the same outer surface.

Each second container element 5 consists of a body 59 presenting a bottom 53 which is indented in relation to the outer surface of body 59, and an upper opening 54, which is wider that the outer surface of body 59.

It will be observed more specifically in the partial cross-sections represented in the FIGS. 1 and 3, that the openings 44 of the first container elements 41 and 54 of the second container elements 51 are suited to receive in their interior indifferently either bottom 43 of the first container element or bottom 53 of the second container element, since each opening 44 and 54 presents an inner profile 8 with a double diameter. matching the outer profile 9 with a double diameter of each of the bottoms 43 and 53.

Moreover said matching is possible since each connecting channel 42 is distant from the bottom 43 of said first container elements 41 of a quantity greater than the height of the inner profile 8 and of the outer profile 9 made respectively on the opening 44 and on the bottom 43 of the container elements.

Thus a plurality of pots 4 and plurality of second container elements 5 can be stacked on each other by matching them, so as to form the structure 1 represented in FIG. 5 which, as can be observed, develops on a vertical plane.

Figure 6:
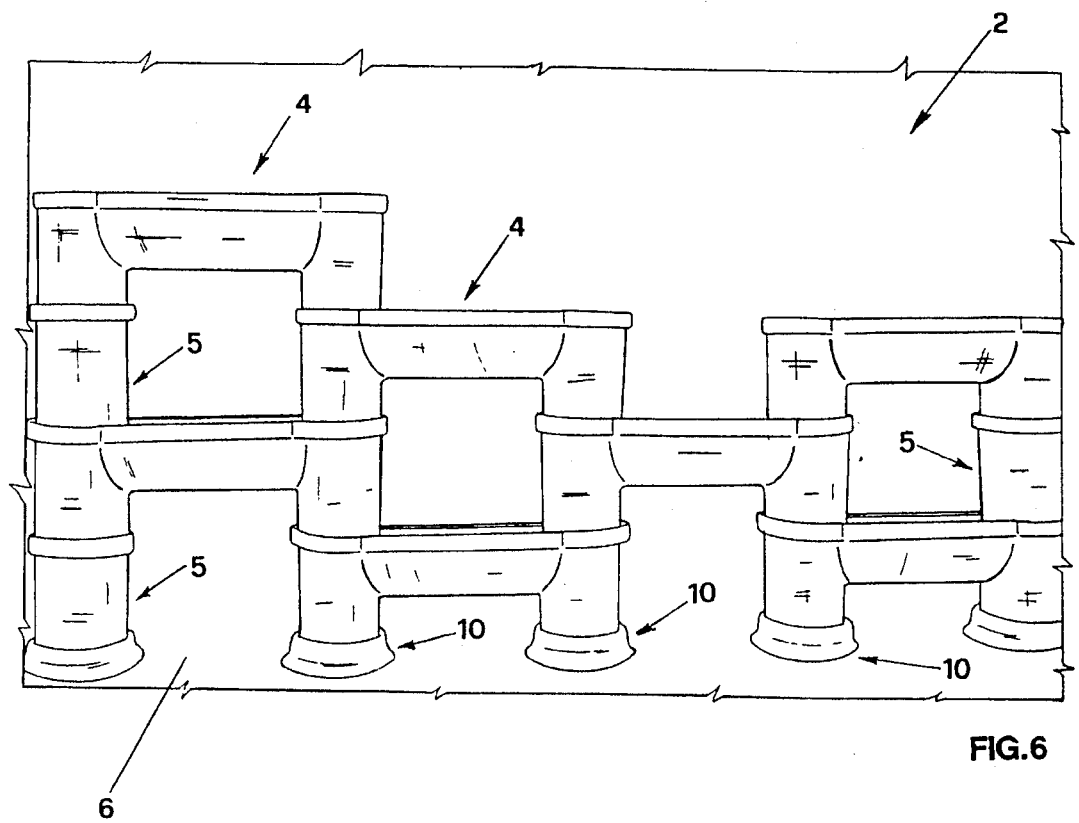
FIG. 6 shows a different composition of the self-supporting modular structure according to the invention, developing in the vertical direction.

In an analogous way a plurality of pots 1 and of second container elements 5 can be matched as represented in FIG. 6, so as to form a structure developing vertically but with a geometric design differing from the preceding one.

Figure 7:
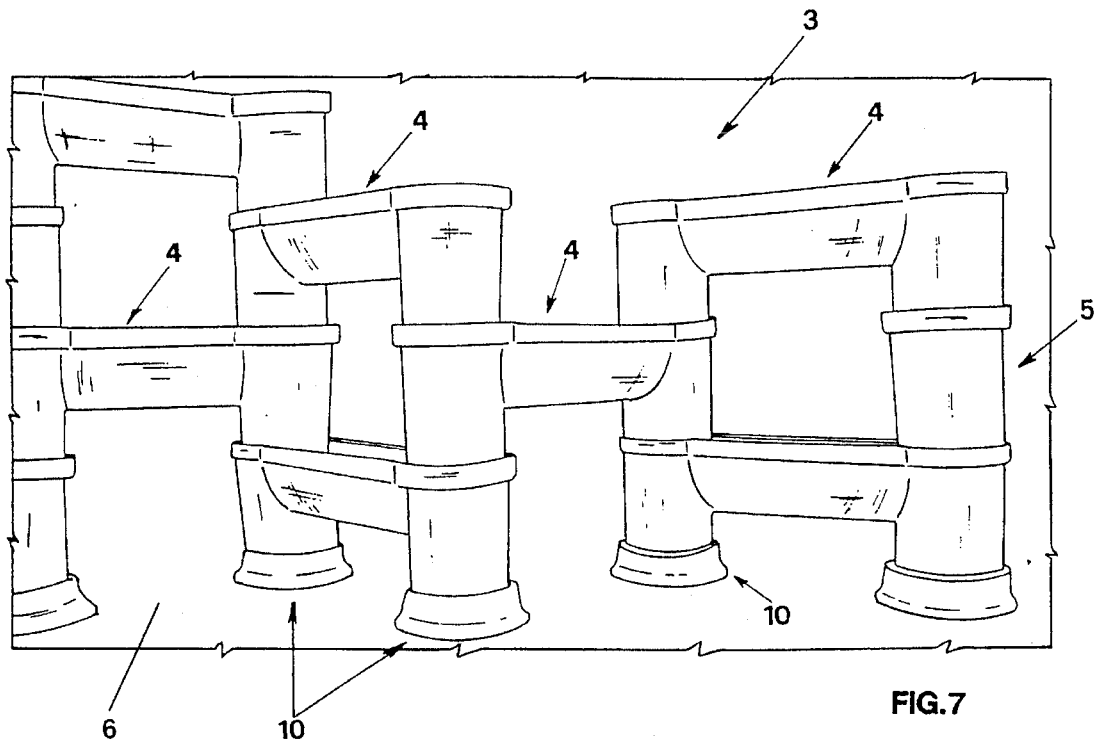
FIG. 7 shows yet another composition of the self-supporting modular structure according to the invention, developing both in the vertical direction and in depth.

Another plurality of pots 1 and of second container elements 5 can be snapped together, as represented in FIG. 7, so as to form a structure developing along vertical planes concurring with each other, thereby obtaining a geometrical design differing from the previously described ones.

In the structures represented in, the FIGS. 5, 6 and 7 it can be observed that each first container element 41 of the pots 4 and each second container element 5 arranged in the bottom row of the structure, rests on the supporting surface 6 through the interposition of an underpot tray 10, also visible in FIG. 4, which presents a base 11 resting on the supporting surface 6 and an upper opening 12 presenting an inner profile 8 with a double diameter matching the outer profile 9 with a double diameter of each bottom 43 and 53, so that it is fit to receive any first container element 41 or any second container element 5.

It can be observed in FIG. 2 that the inner volume 45 of each channel 42 communicates with the inner volume 46 of each first container element 41, so that there exists a communication through channel 42 permitting the passage of the irrigation liquid from one container element to the other.

Figure 8:
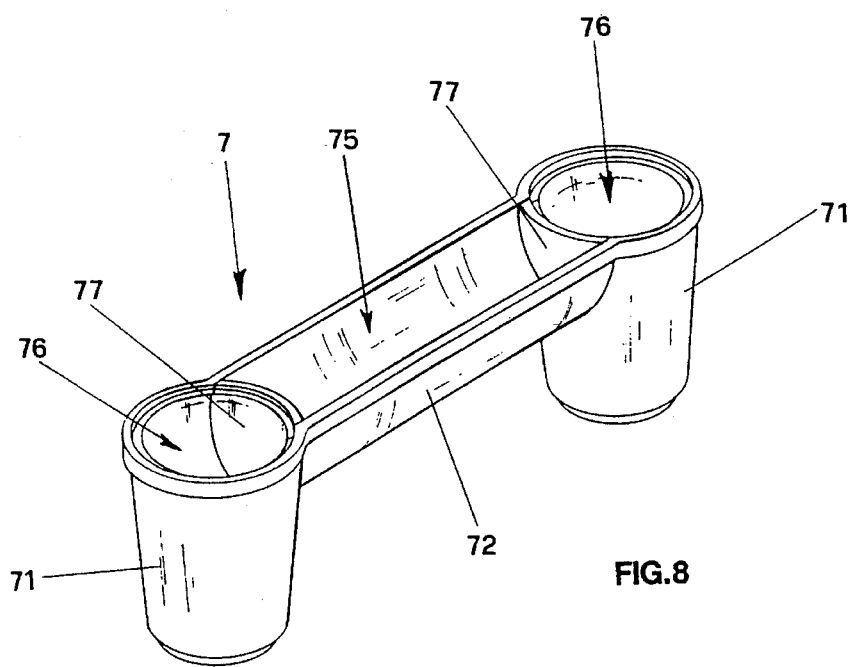
FIG. 8 shows a different embodiment of the flower pot represented in FIG. 1.

A different embodiment of each pot is represented in FIG. 8, wherein it can be observed that the pot, indicated as a whole with 7, consists of a channel 72 joining together the two first container elements 71, the inner volume 75 of channel 72 being separated from the inner volume 76 of each first element 71 through a diaphragm 77 which can be made in a single piece together with channel 72, or it can be made so as to be removable, so that it can be inserted or removed according to the needs of the user.

On the basis of what has been described, it is easy to understand how the flower pots forming the self-supporting modular structure according to the invention permit to arrange and cultivate flowers on vertical planes, which can be parallel to or intersecting each other, following any composition scheme chosen according to the taste of the user.

Moreover, said structures can be easily assembled and reassembled in different geometrical patterns.

It is understood that the flower pots consisting of the channel and of the corresponding first container elements, as well as the second container elements and the underpot-trays can be made in any dimension and shape.

Moreover, each flower pot can comprise more than two first container elements, which will then be joined together by more than one channel.

Whenever necessary the shape of the containers may present any shape of polygonal profile, rather than the shape of a truncated cone.

I claim:

1. A flower pot adapted to be connected together with other flower pots to form a modular plant support comprising:

a container element including axially spaced apart cylindrical members each having a central axis in a common plane, each member having a hollow interior volume, an open top and a closed bottom portion, the open top formed with an upper rim portion having a stepped profile of a selected depth and the closed bottom portion having a stepped profile of a selected height, the rim portion and bottom portion being coaxial with the central axis of the corresponding cylindrical member, the bottom portion being sleevable in mating relationship with the rim portion of a cylindrical member of another of said container elements; and a channel element having an open top and hollow interior interconnecting the cylindrical members along an axis perpendicular to the central axes of said cylindrical members, the channel being located in spaced relation from the bottom portion by a distance at least equal to the height of said bottom portion.

2. A flower pot according to claim 1, wherein the respective stepped profile of the rim portion and bottom portion of, each of the container elements coaxially matches the corresponding stepped profile in the respective rim and bottom portion of another container element through a fixed joint formed by their matching profiles.

3. A flower pot according to claim 1, characterized in that wherein the bottom portion of each of said cylindrical elements has an outer profile with a double diameter, matching a corresponding inner profile also with a double diameter inside the upper open top of the container.

4. A flower pot according to claim 1, further comprising an underpot tray having an open top, and wherein the bottom of each of said cylindrical members fits coaxially inside the underpot tray.

5. A flower pot according to claim 1, wherein the channel has an inner volume joining together the cylindrical members communicating with the interior of said members.

6. A flower pot according to claim 1, wherein the channel has a junction point with each of the cylindrical members; and including a removable diaphragm suited to separate the inner volume of the channel from the inner volume of each of said members.

7. The flower pot according to claim 1 wherein the cylindrical member is sleevable with another cylindrical member rotatably about said axis.

8. A kit for constructing a modular plant support structure including a plurality of container elements adapted to be connected together comprising:

a container element including axially spaced apart hollow cylindrical members each having a central axis in a common plane, each member having an open top and a closed bottom portion, the open top formed with an upper rim portion having a stepped profile of a selected depth and the closed bottom portion having a stepped profile of a selected height, the rim portion and bottom portion being coaxial with the central axis of the corresponding cylindrical member, the bottom portion being sleevable in mating relationship with the rim portion of a cylindrical member of another of said container elements; and a channel element having an open top interconnecting the cylindrical members along an axis perpendicular to the central axes of said cylindrical members, the channel being located in spaced relation from the bottom portion by a distance at least equal to the height of said bottom portion.

* * * * *